June 18, 1968     E. R. FORSMAN     3,388,450
TOOL FOR INSERTING A VALVE SEAT INTO A VALVE BODY
Filed April 7, 1967     3 Sheets-Sheet 2

Earl R. Forsman
INVENTOR.

BY

ATTORNEYS

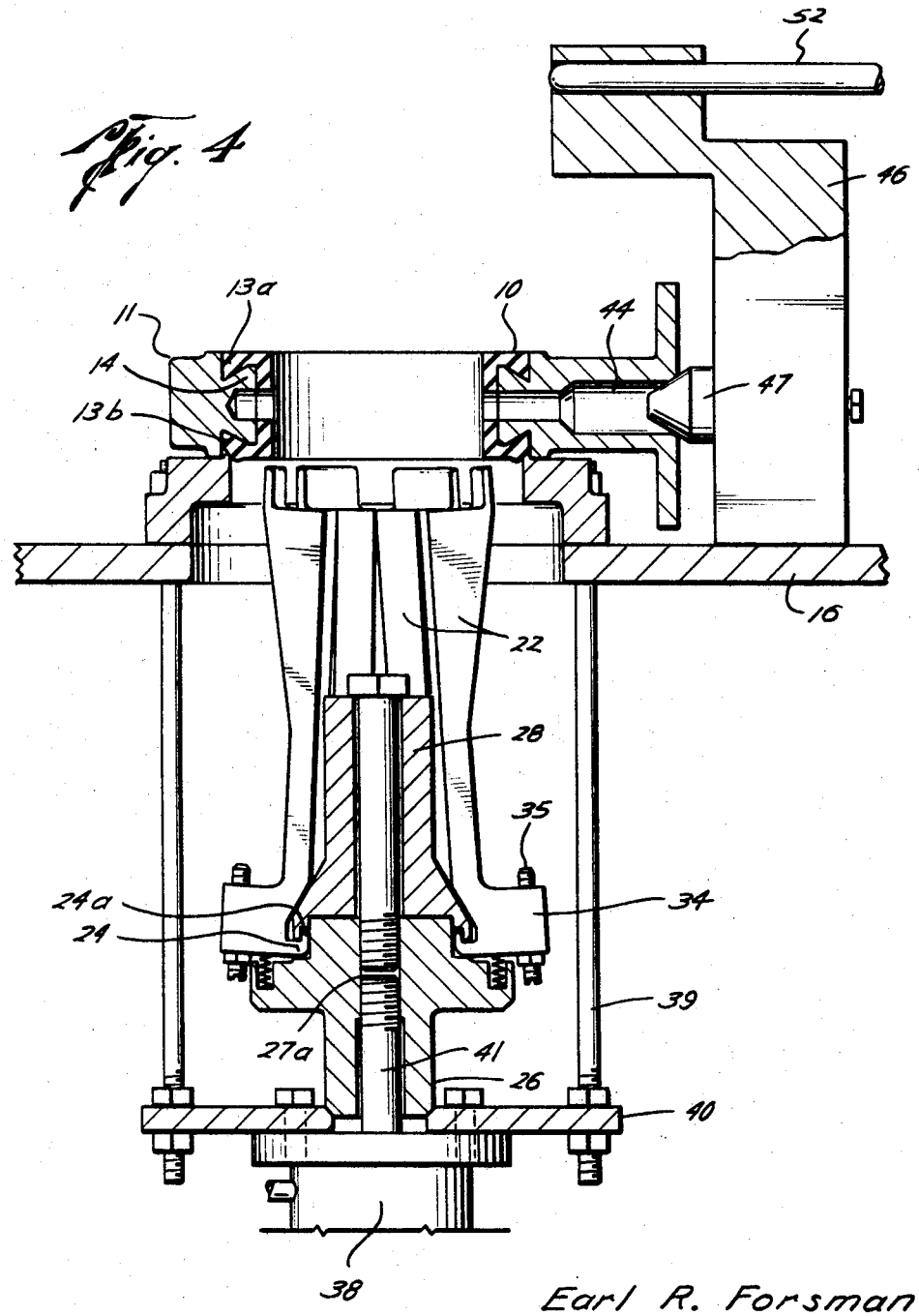

United States Patent Office 3,388,450
Patented June 18, 1968

1

3,388,450
TOOL FOR INSERTING A VALVE SEAT
INTO A VALVE BODY
Earl R. Forsman, Houston, Tex., assignor to Keystone
Valve Corporation, Houston, Tex.
Filed Apr. 7, 1967, Ser. No. 629,259
5 Claims. (Cl. 29—213)

ABSTRACT OF THE DISCLOSURE

A valve seat inserting tool is provided with a plurality of circumferentially arranged fingers for extending through the opening in the valve body. The fingers are pivotally mounted at one end so their free end can pivot toward and away from the longitudinal axis of the opening in the valve body. The fingers are mounted on a piston rod that extends the fingers through the valve body a predetermined distance. An adjustable stop is carried by each finger to pivot the finger outwardly, when the finger is extending through the opening. By adjusting the stop, the fingers can be arranged to receive various sized valve seats. The valve seat is placed in the nest of fingers and the fingers pulled back through the valve body. Cam surfaces on the fingers engage the valve body as the fingers are pulled through it forcing the fingers inwardly to compress the seat sufficiently for it to be pulled into position in the valve body. Before being pulled through the valve body, the valve opening in the seat is aligned with the valve stem opening in the body by two pins in vertical alignment. The pins can extend into the valve stem opening in the body and the valve stem opening in the seat, when the openings are in alignment.

---

This invention relates to a tool for inserting a valve seat in a valve body and, in particular, to a tool for inserting a valve seat into a valve body, where the valve seat has outwardly extending flanges that are greater in diameter than the opening through the body.

In many disc valves, the seat is held in the valve body by an inwardly extending dovetail-shaped flange. This flange fits a groove formed by two spaced, outwardly extending flanges on the outside surface of the seat. To insert the valve seat in the body, one flange must be compressed and deformed sufficiently to pass through the opening through the dovetail-shaped flange. Where the valve seat is made of relatively stiff material, such as a high durometer rubber, it is difficult to install the seat in the body. It becomes increasingly difficult, as the diameter of the valve decreases.

Further complicating this operation is the requirement that the valve seat be installed with the valve stem openings in the body and the seat in alignment. Otherwise, it is necessary to rotate the seat relative to the body, and since the valve seat fits the inner configuration of the body rather closely, this is difficult to do.

It is an object of this invention to provide a tool for inserting a compressible annular valve seat into the opening in a valve body with the valve stem openings in the seat and body in axial alignment.

It is another object of this invention to provide a valve seat inserting tool that can be quickly and easily adjusted to insert valve seats for different diameter valves.

2

It is yet another object of this invention to provide a valve seat inserting tool that employs circumferentially arranged fingers to compress the valve seat and pull it into position in the body in which the fingers move equal distances outwardly away from the longitudinal axis of the opening in the valve body, each time they are extended through the opening in the valve body to receive a valve seat.

It is yet another object of this invention to provide a tool for inserting a compressible annular valve seat, which has an external groove to receive an inwardly extending dovetail-flange on the valve body, that compresses and deforms one side of the annular groove and carries it past the flange on the body until the flange forming the other side of the groove engages the dovetail-flange and pulls the valve seat out of engagement with the tool when the valve seat is properly positioned in the body.

These and other objects, advantages, and features of the invention will be apparent to those skilled in the art from a consideration of this specification, appended claims, and attached drawings.

The preferred embodiment of the invention will now be described in detail in connection with the attached drawings in which, FIGURE 1 is a vertical sectional view of the tool of this invention in position to insert a valve seat in a valve body;

FIGURE 4 is a view similar to FIGURE 1 showing the tool after the valve seat has been installed in the body.

Figure 1:
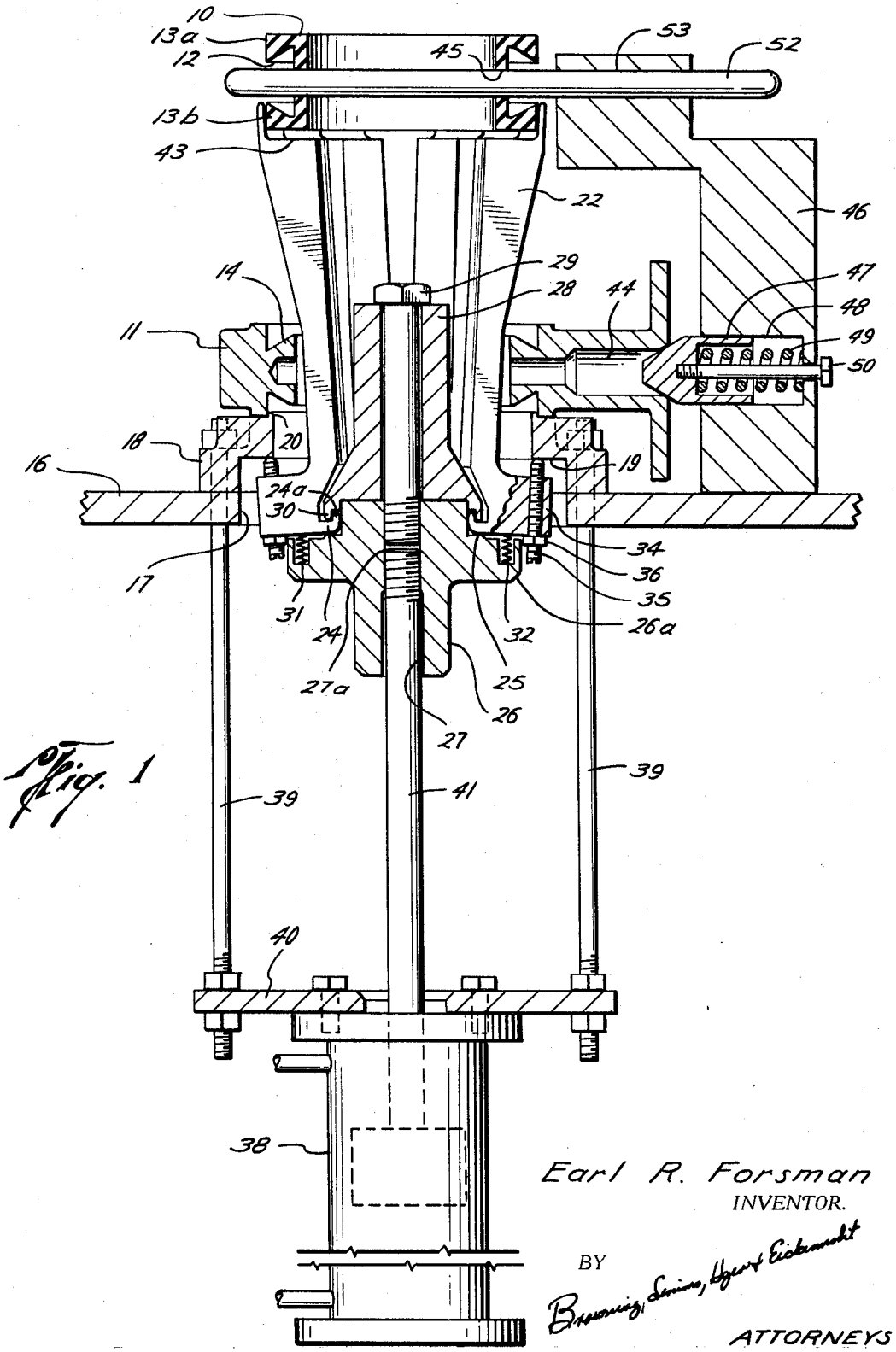

In the drawings, the tool of this invention is shown inserting disc valve seat 10 into disc valve body 11. The valve seat has an external annular groove 12, formed by outwardly extending flanges 13a and 13b. Groove 12 is dovetailed in cross section to receive dovetailed, inwardly extending flange 14 integrally connected to the body and located in the opening through the body.

Means are provided to hold valve body 11 for the insertion of the valve seat. In the embodiment shown, plate 16, which may be a table top supported by legs, etc. (not shown), support the valve body and the valve seat inserting tool to be described below. Plate 16 is provided with opening 17, which is encircled by annular member 18. The opening through the member is stepped to provide downwardly facing shoulder 19, for purposes which will be described below. Valve body 11 rests on the upper surface of annular member 18 and is held with its opening concentric with the opening through the annular member by upwardly extending annular flange 20. This annular flange is designed to engage the wall of the opening through the body.

A plurality of fingers 22 are circumferentially arranged around the longitudinal axis of the opening through the body to extend upwardly through the openings, as shown in FIGURE 1. Means are provided to mount each finger for independent pivotal movement around one end to permit its free end to move away from and toward said axis. In the embodiment shown, each finger is provided with L-shaped member 24. Each member rests on upwardly facing shoulder 25 of cross head 26 and supports the finger to which it is attached. The cross head has a central opening 27, upper portions 27a of which it tapped. Cap 28 is connected to the cross head by bolt 29 which is screwed into the top of the tapped portion of opening 27 in the cross head. Cap 28 has downwardly extending annular flange 30 that hooks over prongs 24a of L-shaped members 24 to hold the fingers in circumferential arrangement on the cross head.

Sufficient space is provided between the prongs on the members and the flange to permit the upper free ends of the fingers to pivot inwardly toward the longitudinal axis of the opening through the valve body to pass through the opening of the valve body. The fingers can also pivot outwardly away from this longitudinal axis sufficiently to receive the valve seat. Resilient means are provided to urge the fingers to pivot inwardly (FIGURE 4) to the position for insertion through the valve body. In the embodiment shown, outwardly extending flange 26a of the cross head is located below the fingers and is provided with a plurality of blind holes 31. Each hole is located directly below a finger. A plurality of coil springs 32 are located in the holes to urge the fingers to pivot around prongs 24a toward their retracted position for extending through the valve body.

Means are provided for rotating each finger away from the longitudinal axis of the opening through the valve body a predetermined distance as the fingers are extended through the opening. The fingers are pivoted outwardly far enough to receive valve seat 10, as shown in FIGURE 1. In the embodiment shown, each finger is provided with an outwardly extending heel portion 34. Each heel has a tapped hole in which is located set screw 35. The set screws are positioned for their ends to engage downwardly facing shoulder 19 of annular member 18 and pivot the fingers outwardly as they are moved upwardly through the valve opening. Since the fingers are moved upwardly the same distance each time, in a manner to be described below, the distance set screws 35 extend above heel portion 34 determines the amount of spread of the fingers. This can be adjusted so the fingers will receive valve seats of different diameter. Lock nut 36 on each set screw insures that the set screws do not get out of adjustment.

The fingers are reciprocated through the valve opening by air cylinder 38. The air cylinder is supported below plate 16 by rods 39 and mounting plate 40. Piston rod 41 has screw threads that connect it to tapped portion 27a of the opening through the cross head.

To insert valve seat 10, the fingers are extended upwardly with the full stroke of air cylinder 38. Set screws 35 have been adjusted to pivot the fingers outwardly far enough to receive the seat, as shown in FIGURE 1. The upper end of each finger is recessed to provide an upwardly facing shoulder 43 that limits the distance the seat can enter the nest of fingers. The purpose of the shoulder is to act as a stop and allow only flange 13b to be encircled by the upper end of the fingers.

Means are provided to align valve stem opening 44 in the valve body and valve stem opening 45 in the valve seat before the seat is inserted in the body. In the embodiment shown, bracket 46 is mounted on plate 16 to extend vertically along side the valve body and the valve seat, when positioned in the fingers. Two pins are mounted in the bracket. First, pin 47 is slidably mounted in opening 48 in the bracket to engage valve stem opening 44 in the valve body. Pin 47 is urged into firm engagement with the opening by coil spring 49 located in opening 48. The outer end of the pin is beveled to limit the distance the pin can enter the valve stem opening. Retainer pin 50 keeps the spring from pushing the pin all of the way out of the opening when no valve body is present.

A second pin 52 is slidably mounted in opening 53 in the bracket in axial alignment with valve stem opening 45 in the valve seat. To align the valve stem openings, first pin 47 is placed in engagement with valve stem opening 44 in the body. The valve seat is positioned in the nest of fingers, as shown in FIGURE 1, and rotated until second pin 52 can pass through valve stem opening 45 in the seat. When the valve seat is so positioned, valve stem opening 45 will then be in axial alignment with valve stem opening 44 in the body, since the longitudinal axes of both pins and the longitudinal axis of the opening through the body all lie in the same plane. Pin 52 is them removed and the tool is ready to insert the valve seat into the body.

To do this, air cylinder 38 pulls the fingers downwardly through the opening in the valve body. Cam means are provided to force the fingers inwardly to compress flange 13b on the seat as the fingers carry the seat into the opening. The seat will remain in the nest of fingers until flange 13a engages flange 14 on the body. Flange 13a will then pull the seat out of the fingers as the fingers continue to move downwardly out of the opening in the valve body. As the seat is pulled out of the fingers by flange 13a, flange 13b will return to its normal shape and engage the lower side of flange 14, as shown in FIGURE 4.

Figure 2:
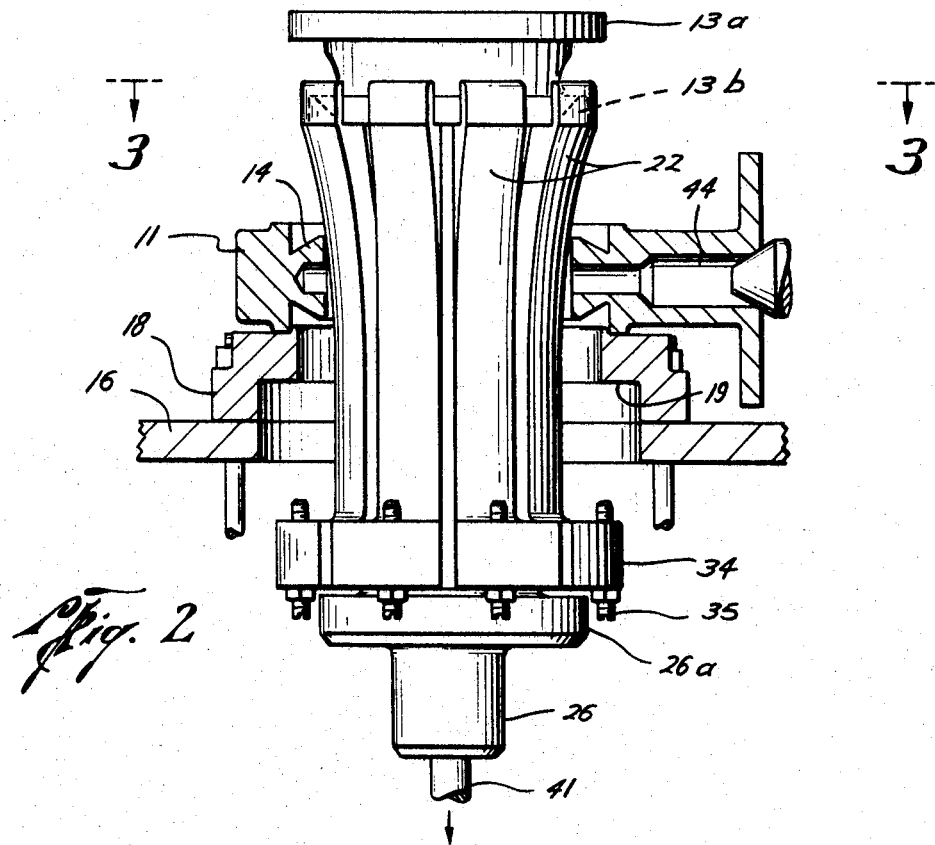
FIGURE 2 is a view similar to FIGURE 1 with the tool shown in elevation as it begins to deform and compress the valve seat for insertion in the valve body.
Figure 3:
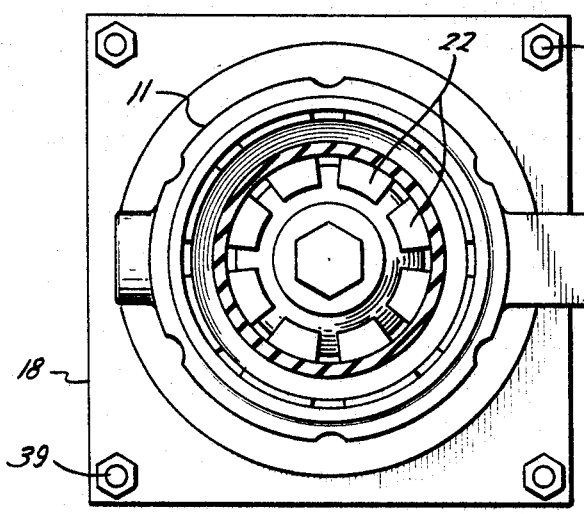
FIGURE 3 is a view taken along line 3—3 of FIGURE 2.

In the embodiment shown, to cam the fingers inwardly, the outside surface of each finger is inclined upwardly and outwardly. These surfaces are engaged by flange 14, as the fingers move downwardly through the valve body which forces the fingers inwardly to compress the lower flange on the seat for positioning in the valve body as shown in FIGURE 2.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A tool for inserting a compressible annular valve seat having outwardly extending flanges into the opening in a valve body with the valve stem openings in the seat and body in axial alignment, where the flanges are greater in diameter than the opening through the body, comprising holding means for the body, a plurality of fingers arranged circumferentially around the longitudinal axis of the opening in the body for extending through the opening, means mounting each finger for independent pivotal movement around one end to permit its free end to move away from and toward said axis, resilient means urging the free end of each finger to pivot independently toward the axis to resiliently hold the fingers in position for their free ends to be moved through the opening in the valve body, adjustable means for rotating each finger away from the longitudinal axis of the opening a predetermined distance, as the fingers are extended through the opening, to receive one flange on a valve seat, means for aligning the valve stem opening in the valve seat with the valve stem opening in the body after the valve seat is positioned in the fingers, means for pulling the fingers out of the opening in the valve body, and cam means for pivoting the fingers inwardly to compress the flange on the seat and carry it into the opening with the fingers until the other flange on the seat engages the body and pulls the seat out of the fingers.

2. The tool of claim 1 in which the adjustable means for pivoting the free ends of the fingers outwardly includes an annular member positioned below the valve body and a pin attached to each finger to engage the member and pivot the free end of the finger outwardly, each of said pins being of adjustable length to permit the tool to be adjusted for a range of valve seat sizes.

3. The tool of claim 2 in which the holding means for the body comprises an upwardly extending flange on the annular member of the adjustable means for engaging the opening in the body.

4. The tool of claim 1 in which the cam means includes an upwardly and outwardly inclined surface on each finger that engages the body as the fingers are pulled through the opening with the seat to force the fingers to pivot inwardly and compress the seat flange sufficiently to pull it into the opening in the body.

5. The tool of claim 1 in which the alignment means includes a bracket mounted adjacent the valve body, a first pin slidably mounted in the bracket to engage the valve stem opening in the body and a second pin slidably mounted in the bracket with its longitudinal axis lying in the plane of the longitudinal axis of the first pin and the longitudinal axis of the opening through the body, said second pin being positioned to engage the valve stem opening of a valve seat when the valve seat is in the fingers to align the opening with the valve stem opening in the body before the seat is installed.

References Cited

UNITED STATES PATENTS

| 2,086,371 | 7/1937 | Tear | 29—235 |
| 2,468,286 | 4/1949 | Behlert | 29—235 |
| 2,657,818 | 11/1953 | Mueller | 29—235 |
| 2,958,124 | 11/1960 | Hardy | 29—235 |

FOREIGN PATENTS 627,563   3/1936   Germany.

MILTON S. MEHR, *Primary Examiner.*